(12) United States Patent
Kato et al.

(10) Patent No.: US 11,459,169 B2
(45) Date of Patent: Oct. 4, 2022

(54) AIRCRAFT WATER TANK AND METHOD FOR MANUFACTURING SAME

(71) Applicant: The Yokohama Rubber Co., LTD., Tokyo (JP)

(72) Inventors: Hayato Kato, Hiratsuka (JP); Takafumi Kobayashi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 238 days.

(21) Appl. No.: 16/766,641

(22) PCT Filed: Nov. 21, 2018

(86) PCT No.: PCT/JP2018/042944
§ 371 (c)(1),
(2) Date: May 22, 2020

(87) PCT Pub. No.: WO2019/103026
PCT Pub. Date: May 31, 2019

(65) Prior Publication Data
US 2020/0369464 A1 Nov. 26, 2020

(30) Foreign Application Priority Data
Nov. 22, 2017 (JP) .............................. JP2017-224601

(51) Int. Cl.
*B65D 88/06* (2006.01)
*B65D 90/08* (2006.01)
(Continued)

(52) U.S. Cl.
CPC ............. *B65D 88/06* (2013.01); *B65D 90/08* (2013.01); *B65D 90/626* (2013.01); *B64F 5/10* (2017.01);
(Continued)

(58) Field of Classification Search
CPC ....... B64F 5/10; B65D 90/08; B65D 90/8814; B65D 90/8806; B65D 90/54; B65D 88/1618; F17C 13/06; B29C 65/48
(Continued)

(56) References Cited

U.S. PATENT DOCUMENTS 8,573,253 B2 * 11/2013 Ogami .................... F17C 13/04
220/582
8,640,910 B2 * 2/2014 Novak ...................... F17C 1/16
220/582
(Continued)

FOREIGN PATENT DOCUMENTS

JP  2001-214998  8/2001
JP  2004-211783  7/2004
(Continued)

OTHER PUBLICATIONS

European Search Report for European Application No. 18880941.2 dated Jul. 19, 2021, 5 pages, Germany.
(Continued)

*Primary Examiner* — Anthony D Stashick
*Assistant Examiner* — Raven Collins
(74) *Attorney, Agent, or Firm* — Thorpe North & Western

(57) ABSTRACT

In an aircraft water tank, a mouthpiece is attached to an inner liner, and an overflowing adhesive is received in an annular missing portion provided to an expanded portion of the mouthpiece through the gap between a skirt portion and the inner liner. Further, a sealant fills the part of the annular missing portion, which is exposed from an end of a plate portion for the expanded portion.

5 Claims, 8 Drawing Sheets

(51) Int. Cl.
    *B65D 90/62*   (2006.01)
    *B64F 5/10*   (2017.01)
(52) U.S. Cl.
    CPC .... *B65D 2588/54* (2013.01); *B65D 2590/542* (2013.01)
(58) Field of Classification Search
    USPC .................................................. 220/562, 581
    See application file for complete search history.

(56) References Cited

U.S. PATENT DOCUMENTS

| | | | |
|---|---|---|---|
| 9,377,162 B2* | 6/2016 | Sejima | F17C 1/16 |
| 11,174,990 B2* | 11/2021 | Otsubo | F17C 1/02 |
| 2010/0163565 A1 | 7/2010 | Matsuoka et al. | |
| 2016/0257403 A1 | 9/2016 | Masuda | |
| 2016/0264284 A1 | 9/2016 | Masuda | |
| 2018/0142839 A1 | 5/2018 | Taguchi et al. | |

FOREIGN PATENT DOCUMENTS

| | | |
|---|---|---|
| JP | 2011-251736 | 12/2011 |
| JP | 2014-142017 | 8/2014 |
| JP | 2015-085946 | 5/2015 |
| WO | WO 2007/119444 | 10/2007 |
| WO | WO 2015/060308 | 4/2015 |
| WO | WO 2015/064424 | 5/2015 |
| WO | WO 2016/194574 | 12/2016 |

OTHER PUBLICATIONS

International Search Report for International Application No. PCT/JP2018/042944 dated Feb. 12, 2019, 4 pages, Japan.

* cited by examiner

AIRCRAFT WATER TANK AND METHOD FOR MANUFACTURING SAME

TECHNICAL FIELD

The present technology relates to an aircraft water tank and a method for manufacturing the same.

BACKGROUND ART

In the related art, an aircraft water tank includes a tank body, which is formed of an inner liner formed by blow molding and a fiber-reinforced resin layer covering the inner liner, and the tank body includes a cylindrical portion and dome portions provided on both sides of the cylindrical portion.

An opening portion that allows cleaning of the internal space of the tank body is provided at the center of each of the dome portions on both sides of the aircraft water tank. The opening portion is formed by a mouthpiece attached to the center of the dome portion, and a lid is joined detachably to the mouthpiece.

The mouthpiece includes a cylindrical portion having a female thread to be engaged with a male thread of the lid and a skirt portion spreading outward of the cylindrical portion in the radial direction from the end of the cylindrical portion. The center of the dome portion of the inner liner is bonded to the inner circumferential surface of the skirt portion with an adhesive, and the fiber-reinforced resin layer is bonded to the outer circumferential surface of the skirt portion (Japan Unexamined Patent Publication No. 2015-085946).

The center of the dome portion of the inner liner is bonded to the inner circumferential surface of the skirt portion in the following manner.

First, the adhesive is applied to the center of the dome portion of the inner liner, the skirt portion of the mouthpiece and the center of the dome portion of the inner liner are brought closer in an axial direction of the mouthpiece, and the skirt portion and the center of the dome portion are aligned with each other.

In this case, a relatively large amount of the adhesive is applied so that an excessive adhesive flows out (overflows) from the end of the inner liner. This is for the purpose of visually confirming that the adhesive securely fills between the skirt portion and the inner liner without a gap.

Further, after the adhesive is cured, an operation of removing an overflowing part of the adhesive is performed.

An operation of visually confirming and removing the overflowing adhesive described above is performed while observing the periphery of the end of the inner liner through use of a mirror inserted inside the tank body from the opening portion.

Further, in order to prevent water from directly contacting with the adhesive, a coating operation in which a material approved by the Food and Drug Administration (FDA) is applied to the surface of the skirt portion of the mouthpiece from the periphery of the end of the center of the dome portion of the inner liner is performed.

Thus, in the related-art step for manufacturing the aircraft water tank, the coating operation is further required in addition to the complicated operation of confirming the overflowing adhesive while performing observation through use of a mirror and removing the overflowing part of the adhesive.

Further, at the time of maintenance, the coating is required to be inspected and repaired, and hence improvement at a certain degree has been desired for increasing manufacturing efficiency and reducing costs of the aircraft water tank and increasing efficiency of a maintenance operation.

In view of this, the present applicant has proposed an aircraft water tank in which an end of an inner liner is away from a sealing member provided between a lid and a mouthpiece so as to be close to an outer side of a tank body for the purpose of preventing drinking water from contacting with the end of the inner liner at the time of using the aircraft water tank (International Patent Publication No. WO 2016/194574).

In this proposal, the mouthpiece is provided with a cylindrical portion including a joint portion, which is capable of being joined to a lid, at one axial end, a skirt portion spreading annularly outward of the cylindrical portion in the radial direction from the other axial end of the cylindrical portion, and an expanded portion expanded annularly inward of the cylindrical portion in the radial direction from the other axial end of the cylindrical portion. A center of a dome portion of the inner liner is bonded from a position corresponding to the skirt portion to a position corresponding to the expanded portion close to the joint portion with an adhesive. Under a state in which the mouthpiece is closed with the lid, the end of the center of the dome portion of the inner liner is positioned on an outer side of a water containment space.

With the configuration described above, the end of the center of the dome portion of the inner liner is positioned on the outer side of the water containment space, and hence the adhesive is prevented from contacting with the drinking water in the water containment space. Thus, the operation of confirming the overflowing adhesive while performing observation through use of a mirror or the coating operation as described above are not required.

However, with the configuration described above, an operation of forming the inner liner, which requires a skilled technique of bending the end of the inner liner and attaching the end to the expanded portion by heating the end of the center of the dome portion of the inner liner and abutting the end against the expanded portion through use of a dedicated jig.

Thus, skilled technique is required, which is disadvantageous in reducing manufacturing costs of the aircraft water tank.

SUMMARY

The present technology provides an aircraft water tank and a method for manufacturing the same that are advantageous in simplifying an operation of attaching a mouthpiece to an inner liner and reducing manufacturing costs.

The present technology includes an inner liner including a dome portion, and a mouthpiece having an annular shape, the mouthpiece being attached to a center of the dome portion and being opened and closed by a lid, the mouthpiece including: a cylindrical portion including a joint portion, which is capable of being joined to the lid, at one axial end, a skirt portion spreading annularly outward of the cylindrical portion in a radial direction from the other axial end of the cylindrical portion, and an expanded portion that is expanded annularly inward of the cylindrical portion in the radial direction from the other axial end of the cylindrical portion, the skirt portion including a skirt inner surface to which the inner liner is attached, the expanded portion including: a first expanded surface formed of a curved surface that is continuously connected to the skirt inner surface, is displaced inward in the radial direction, and extends toward the one axial end of the cylindrical portion, and a second expanded surface that is displaced inward in the radial direction from a position corresponding to the expanded portion positioned on the one axial end side of the cylindrical portion, and extends toward the other axial end of the cylindrical portion, and the inner liner being attached from the skirt inner surface to the first expanded surface with an adhesive, wherein an annular missing portion is provided in the first expanded surface, the annular missing portion being depressed inside of the expanded portion with a width in an axial direction of the cylindrical portion and extending along an entire circumference of the first expanded surface in a circumferential direction, the center of the dome portion of the inner liner is formed of a plate portion for the skirt portion, which is bonded to the skirt inner surface, and a plate portion for the expanded portion, which is connected continuously to an end of the plate portion for the skirt portion and bonded to the first expanded surface, and has an end positioned at an intermediate portion of the annular missing portion in a width direction under a state of being bonded to the first expanded surface, the center of the dome portion and the mouthpiece are brought close to each other in the axial direction of the mouthpiece, the plate portion for the skirt portion is aligned with the skirt inner surface through intermediation of the adhesive, the plate portion for the expanded portion is aligned with the first expanded surface, and an excessive part of the adhesive is received in the annular missing portion, and a sealant fills a part of the annular missing portion, which is exposed from the end of the plate portion of the expanded portion.

Further, the present technology includes an inner liner including a dome portion, and a mouthpiece having an annular shape, the mouthpiece being attached to a center of the dome portion and being opened and closed by a lid, the mouthpiece including: a cylindrical portion including a joint portion, which is capable of being joined to the lid, at one axial end, a skirt portion spreading annularly outward of the cylindrical portion in a radial direction from the other axial end of the cylindrical portion, and an expanded portion that is expanded annularly inward of the cylindrical portion in the radial direction from the other axial end of the cylindrical portion, the skirt portion including a skirt inner surface to which the inner liner is attached, the expanded portion including: a first expanded surface formed of a curved surface that is continuously connected to the skirt inner surface, is displaced inward in the radial direction, and extends toward the one axial end of the cylindrical portion, and a second expanded surface that is displaced inward in the radial direction from a position corresponding to the expanded portion positioned on the one axial end side of the cylindrical portion, and extends toward the other axial end of the cylindrical portion, and the inner liner being attached from the skirt inner surface to the first expanded surface with an adhesive, wherein an annular missing portion is provided in the first expanded surface, the annular missing portion being depressed inside of the expanded portion with a width in an axial direction of the cylindrical portion and extending along an entire circumference of the first expanded surface in a circumferential direction, an end of the inner liner is positioned at an intermediate portion of the annular missing portion in a width direction, and the adhesive that is left over after bonding the inner liner to the skirt inner surface and the first expanded surface is received in a gap between the inner liner and the annular missing portion, and a sealant fills a remaining part of the annular missing portion, which does not receive the adhesive, and the adhesive received in the annular missing portion is covered with the inner liner and the sealant.

According to the present technology, it can be visually confirmed directly whether the overflowing adhesive is received along the entire circumference of the annular missing portion. Thus, unlike the related art, it is not required to confirm that the adhesive overflows while observing the end of the inner liner through use of a mirror inserted into the internal space of the tank body, to remove the overflowing adhesive while performing observation through use of a mirror, or to perform a coating operation while performing observation through use of a mirror.

Further, there is no need to perform the operation of forming the inner liner, which requires the skilled technique of bending the end of the inner liner and attaching the end to the expanded portion by heating the end of the inner liner and abutting the end against the expanded portion through use of a dedicated jig.

Therefore, it is advantageous in simplifying the assembling operation of attaching the mouthpiece to the inner liner and reducing manufacturing costs.

DETAILED DESCRIPTION

Next, with reference to the drawings, an aircraft water tank according to the present technology is described together with a method for manufacturing the same.

Figure 1:
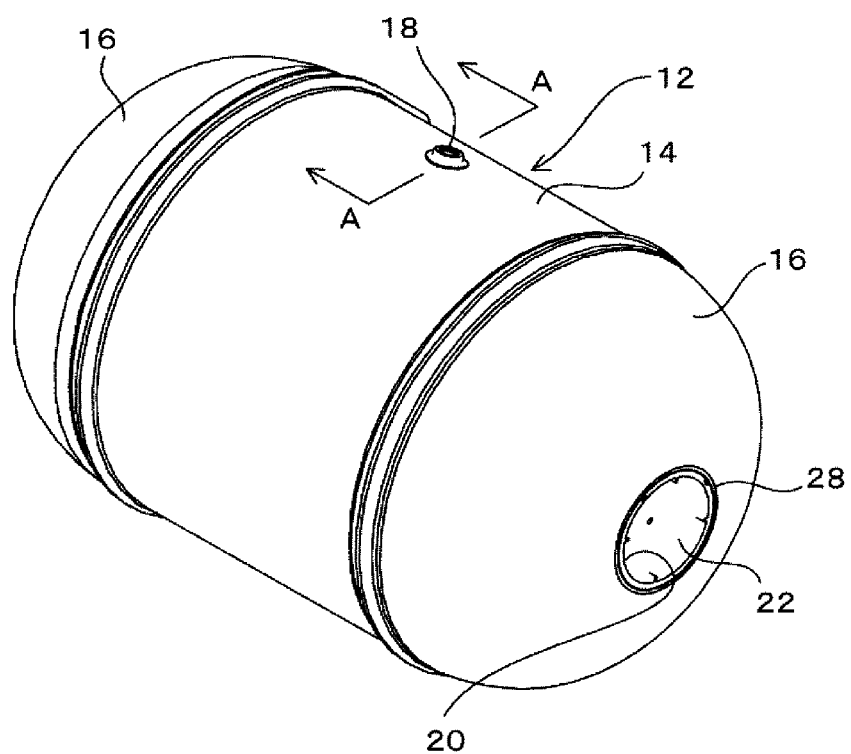
FIG. 1 is a perspective view of an aircraft water tank.
Figure 2:
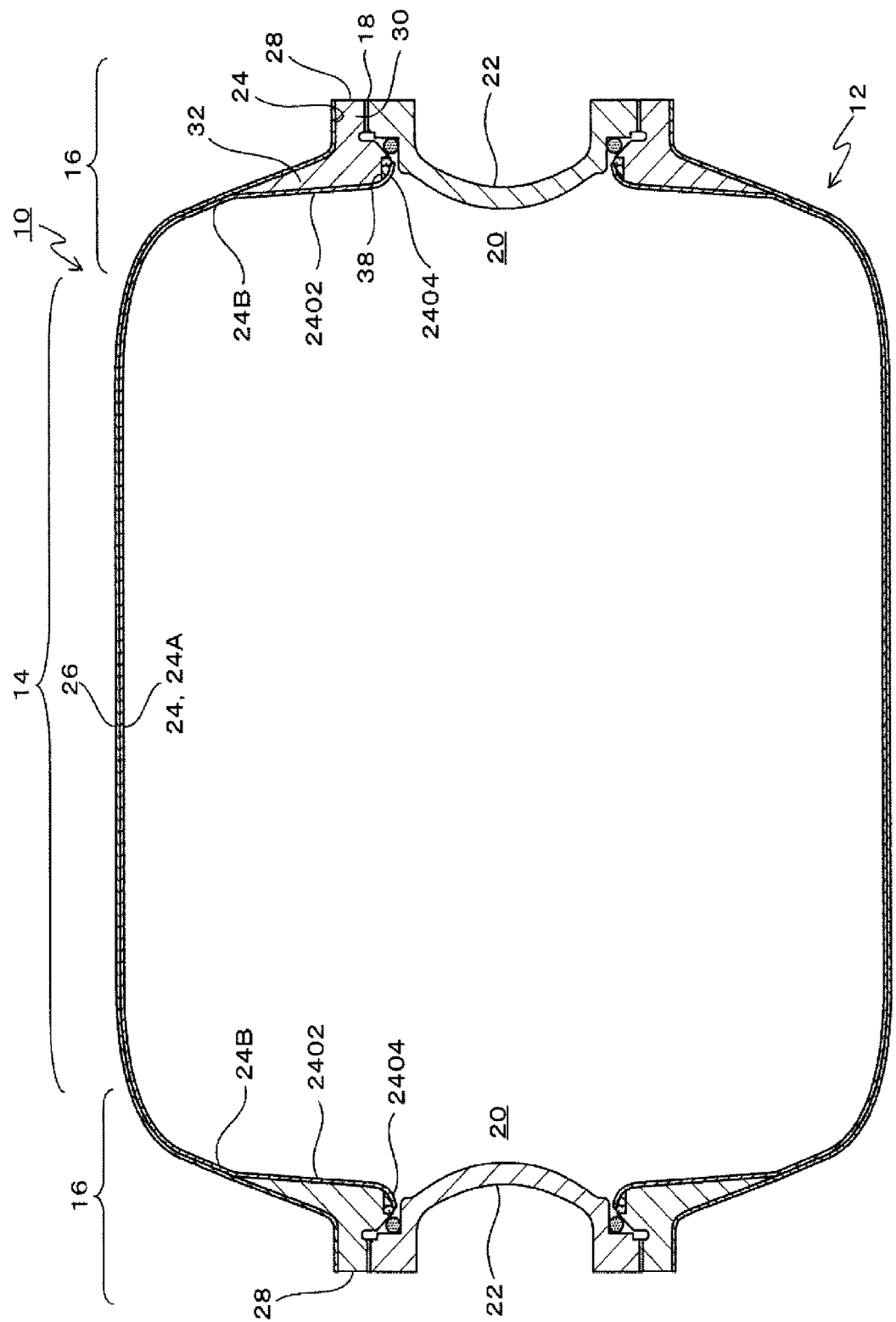
FIG. 2 is a cross-sectional view of an aircraft water tank.

As illustrated in FIG. 1 and FIG. 2, an aircraft water tank 10 is installed in an aircraft and contains drinking water. The aircraft water tank 10 includes a tank body 12 having an internal space that functions as a water containment space.

The tank body 12 includes a cylindrical portion 14 and dome portions 16 provided on both sides of the cylindrical portion 14.

A water supply tank port 18 that supplies the drinking water to the tank body 12 is provided to the upper part of the cylindrical portion 14, and a feeding tank port (not shown) that feeds the drinking water inside the tank body 12 to various locations in the aircraft is provided in the lower portion of the cylindrical portion 14.

Further, a nozzle portion for a pipe (not shown) for supplying the water to various locations in the aircraft is provided to the upper part of the cylindrical portion 14, and a nozzle portion for a pipe (not shown) for discharges the water is provided to the lower part of the cylindrical portion 14.

An opening portion 20 that allows cleaning of the internal space of the tank body 12 is provided at the center of each of the dome portions 16 on both the sides, and the opening portion 20 is opened and closed with a lid 22.

As illustrated in FIG. 2, the tank body 12 includes an inner liner 24 that forms an inner surface of the aircraft water tank 10 and a fiber-reinforced resin layer 26 that covers an outer surface of the inner liner 24.

The inner liner 24 has a hollow body forming a contour of the aircraft water tank 10, and is formed by blow molding. The blow molding involves melting a synthetic resin into a pipe-like shape, inserting the pipe into a mold, and pumping air into the interior of the pipe to obtain a molded product.

The inner liner 24 obtained by the blow molding includes a cylindrical portion 24A and dome portions 24B provided on both sides of the cylindrical portion 24A.

Figure 4:
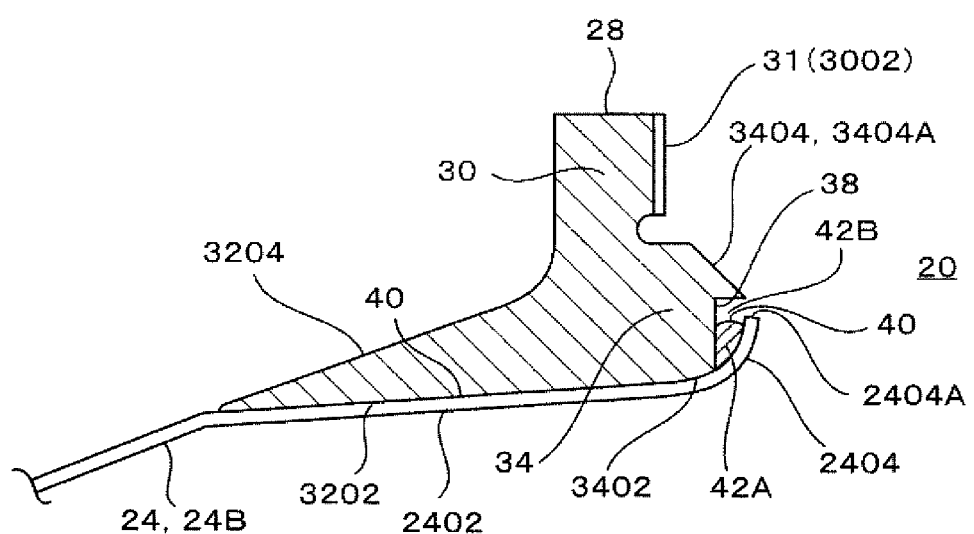
FIG. 4 is a cross-sectional view illustrating a state in which the mouthpiece is bonded to an inner liner.

As illustrated in FIG. 2 and FIG. 4, the center of the dome portion 24B is formed of a plate portion 2402 for a skirt portion, which is formed of a cone surface, and a plate portion 2404 for an expanded portion, which is formed of a curved surface continuously connected to the inner circumference end of the plate portion 2402 for the skirt portion.

Various known materials, such as a polyolefin resin including polypropylene or polyethylene being a thermoplastic resin, which are approved by the FDA may be used as the inner liner 24.

The fiber-reinforced resin layer 26 is formed by a filament winding method in which reinforcing fibers (filaments) impregnated with a thermosetting resin are wound around the outer circumferential surface of the inner liner 24.

Various known synthetic resins such as epoxy resin can be used as the thermosetting resin. Various known fibers such as carbon fibers or glass fibers can be used as the reinforcing fibers.

Figure 7:
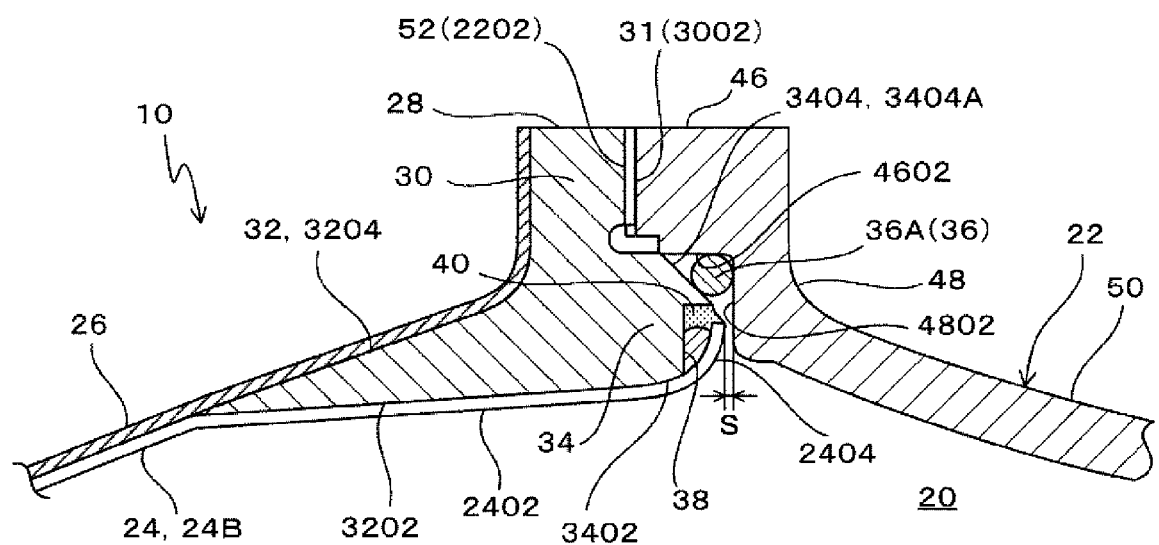
FIG. 7 is a cross-sectional view illustrating a state in which a lid is fastened to the mouthpiece.

The opening portions 20 are formed of annular mouthpieces 28 attached between both the ends of the inner liner 24 and both the ends of the fiber-reinforced resin layer 26. As illustrated in FIG. 2 and FIG. 7, at the time of using the aircraft water tank 10, the opening portions 20 are closed with the lids 22.

As illustrated in FIG. 2, the mouthpiece 28 is arranged at the center of the dome portion 24B.

Figure 3:
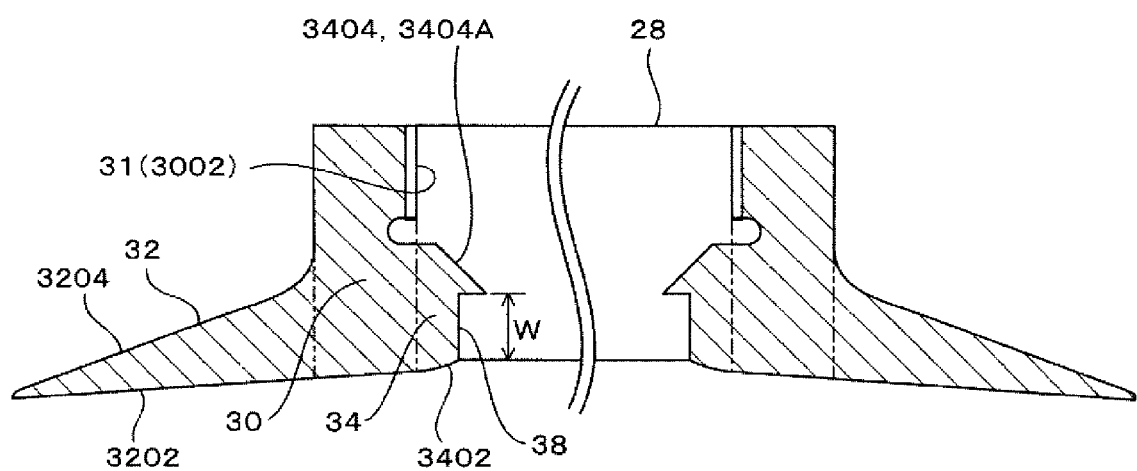
FIG. 3 is a cross-sectional view of a mouthpiece.

As illustrated in FIG. 3, the mouthpiece 28 includes a cylindrical portion 30, a skirt portion 32, and an expanded portion 34.

As indicated in a region with the imaginary line in FIG. 3, the cylindrical portion 30 includes a mouthpiece-side joint portion 3002, which is capable of being joined to the lid 22, at one axial end, and the mouthpiece-side joint portion 3002 is formed of a female thread 31 formed on an inner circumferential portion of the one axial end of the cylindrical portion 30.

The skirt portion 32 spreads annularly outward of the cylindrical portion 30 in the radial direction from the other axial end of the cylindrical portion 30.

As illustrated in FIG. 7, the skirt portion 32 includes a skirt inner surface 3202 to which the inner liner 24 is attached and a skirt outer surface 3204 on which the fiber-reinforced resin layer 26 is provided.

As illustrated in FIG. 3, the expanded portion 34 is expanded annularly inward of the cylindrical portion 30 in the radial direction from the other axial end of the cylindrical portion 30.

The expanded portion 34 includes a first expanded surface 3402 and a second expanded surface 3404.

The first expanded surface 3402 is formed of a curved surface that is continuously connected to the skirt inner surface 3202, is displaced inward in the radial direction, and extends toward the one axial end of the cylindrical portion 30.

The second expanded surface 3404 is displaced inward in the radial direction from a position corresponding to the expanded portion 34 positioned on the one axial end side of the cylindrical portion 30, and extends toward the other axial end of the cylindrical portion 30.

The second expanded surface 3404 is provided with a cone surface 3404A that is displaced inward in the radial direction and extends toward the other axial end of the cylindrical portion 30, and a sealing member 36 (FIG. 7) mounted to the lid 22 is held in elastic contact with the cone surface 3404A. In the present embodiment, the entire second expanded surface 3404 is formed of the cone surface 3404A.

An annular missing portion 38 is provided at a position in the first expanded surface 3402, which is close to the second expanded surface 3404. The annular missing portion 38 is depressed inside of the expanded portion 34 with a width W in the axial direction of the cylindrical portion 30, and extends along the entire circumference of the first expanded surface 3402 in the circumferential direction. Note that the annular missing portion 38 may be provided from a position in the first expanded surface 3402, which is close to the second expanded surface 3404, to a position in the second expanded surface 3404, which is close to the first expanded surface 3402, or alternatively may be provided only at the position in the first expanded surface 3402, which is close to the second expanded surface 3404. The annular missing portion 38 is provided at the position described above, which is advantageous in visually confirming whether an overflowing adhesive 40 described later is received along the entire circumference of the annular missing portion 38 directly through the opening portion 20 of the mouthpiece 28.

As illustrated in FIG. 4, the plate portion 2402 for the skirt portion, which is provided to the inner liner 24, is bonded to the skirt inner surface 3202 with the adhesive 40, and the plate portion 2404 for the expanded portion, which is provided to the inner liner 24, is bonded to the first expanded surface 3402 with the adhesive 40. An end 2404A of the plate portion 2404 for the expanded portion, which is provided to the inner liner 24, is positioned at the intermediate portion of the annular missing portion 38 in the width direction.

Figure 5:
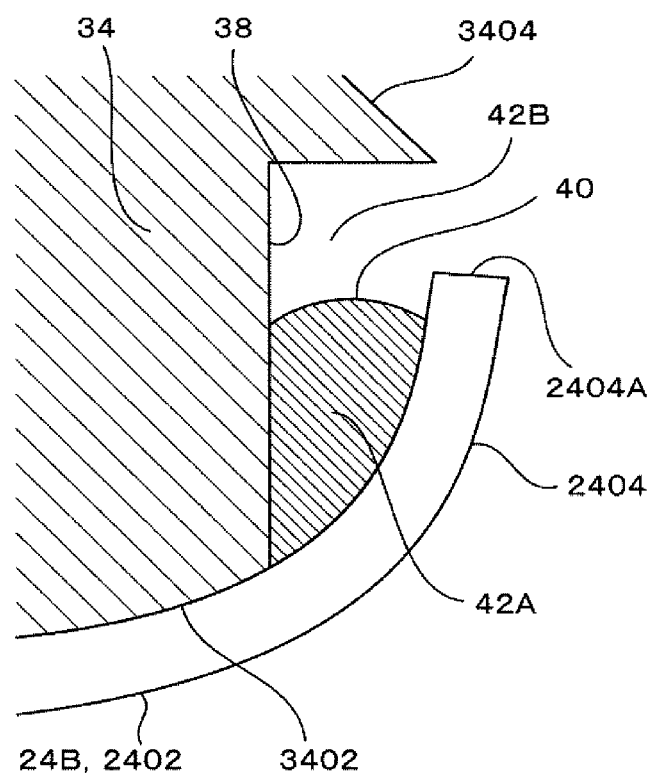
FIG. 5 is an enlarged cross-sectional view illustrating a state in which an overflowing adhesive is received in an annular missing portion.

As illustrated in FIG. 5, the plate portion 2402 for the skirt portion and the annular missing portion 38 form a lower receiving space 42A having an opened upper part, and an upper receiving space 42B having an opened side is at the position corresponding to the annular missing portion 38 positioned above the lower receiving space 42A. The adhesive 40 that is left over after bonding the plate portion 2402 for the skirt portion and the skirt inner surface 3202 and bonding the plate portion 2402 for the skirt portion and the first expanded surface 3402 is received in the lower receiving space 42A.

Figure 6:
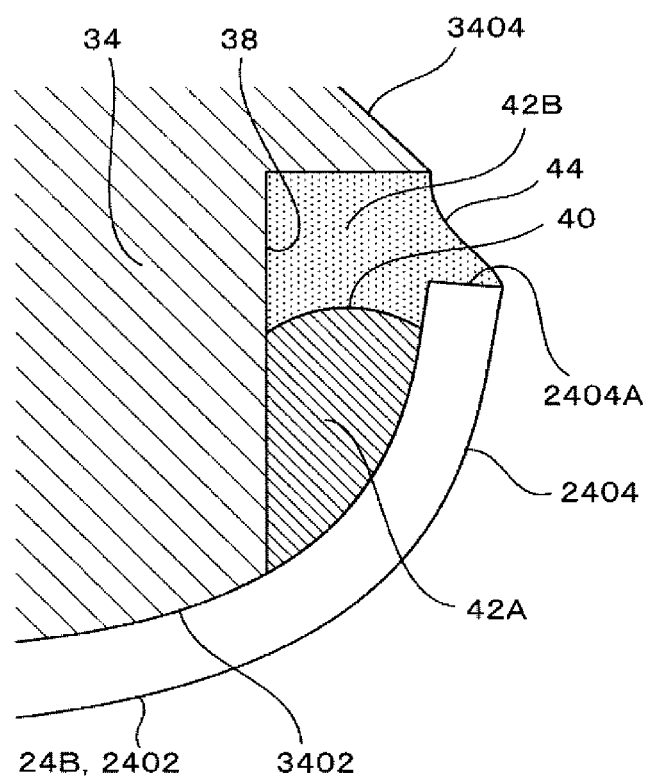
FIG. 6 is an enlarged cross-sectional view illustrating a state in which a sealant fills the annular missing portion.

Further, as illustrated in FIG. 6, a sealant 44 fills a part of the lower receiving space 42A, which does not receive the adhesive 40, and the upper receiving space 42B, and the sealant 44 closes the upper receiving space 42B and forms the surface of the expanded portion 34.

Various known materials such as silicon that is approved by the FDA may be used as the sealant 44.

Specifically, the end 2404A of the inner liner 24 is positioned at the intermediate portion of the annular missing portion 38 in the width direction, the adhesive 40 is received between the inner liner 24 and the annular missing portion 38, the sealant 44 fills the remaining part of the annular missing portion 38, which does not receive the adhesive 40, and the sealant 44 closes the remaining part of the annular missing portion 38 so as to form the surface of the expanded portion 34 at the remaining part of the annular missing portion 38.

As illustrated in FIG. 7, the lid 22 includes an annular plate portion 46, a cylindrical portion 48 protruding from an inner circumferential portion of one end surface of the annular plate portion 46 in the thickness direction, and an end surface portion 50 that connects a distal end of the cylindrical portion 48.

On the outer circumferential portion of the annular plate portion 46, a male thread 52 is formed as a lid-side joint portion 2202 that is joined to the mouthpiece-side joint portion 3002, and the male thread 52 is engageable with the female thread 31.

Further, in the present embodiment, an O ring 36A is mounted as the sealing member 36 at a position in the outer circumferential surface of the cylindrical portion 48, which is close to the annular plate portion 46. The O ring 36A is mounted to the lid 22, and thus an operation of opening and closing the opening portion 20 with the lid 22 is facilitated.

Note that, in the present embodiment, the mouthpiece 28 and the lid 22 are formed of the same synthetic resin material approved by the FDA so that the male thread 52 and the female thread 31 are smoothly joined.

Under a state in which the lid 22 is joined to the opening portion 20 via the female thread 31 and the male thread 52, the O ring 36A is compressed between a part of the lid 22, which protrudes from the female thread 31 to the internal space of the tank body 12, and a part of the mouthpiece 28. With this, the opening portion 20 is closed liquid-tightly, and the closed water containment space is formed in the internal space of the tank body 12.

In the present embodiment, the part of the lid 22 that compresses the O ring 36A is a corner portion formed by an end surface 4602 of the annular plate portion 46 and an outer circumferential surface 4802 of the cylindrical portion 48. The part of the mouthpiece 28 that compresses the O ring 36A is the cone surface 3404A forming the second expanded surface 3404.

Further, under a state in which the lid 22 is joined to the opening portion 20 via the female thread 31 and the male thread 52, a gap S of approximately from 1 mm to 2 mm is secured between the first expanded surface 3402 and the second expanded surface 3404 of the expanded portion 34 as well as the sealant 44 received in the annular missing portion 38, and the outer circumferential surface 4802.

According to the aircraft water tank 10 described above, the adhesive 40 is received between the inner liner 24 positioned in the drinking water and the annular missing portion 38, the sealant 44 fills the remaining part of the annular missing portion 38, which does not receive the adhesive 40, and the sealant 44 forms the surface of the expanded portion 34 of the annular missing portion 38 together with the plate portion 2404 for the expanded portion.

Therefore, at the time of using the aircraft water tank 10, the water contained in the internal space of the tank body 12 is prevented from contacting with the adhesive 40.

Next, a procedure of attaching the inner liner 24 and the mouthpiece 28 is described.

The inner liner 24 including the cylindrical portion 24A and the dome portions 24B is formed by the blow molding.

Further, the mouthpiece 28 including the cylindrical portion 30, the skirt portion 32, and the expanded portion 34 is prepared.

Figure 8:
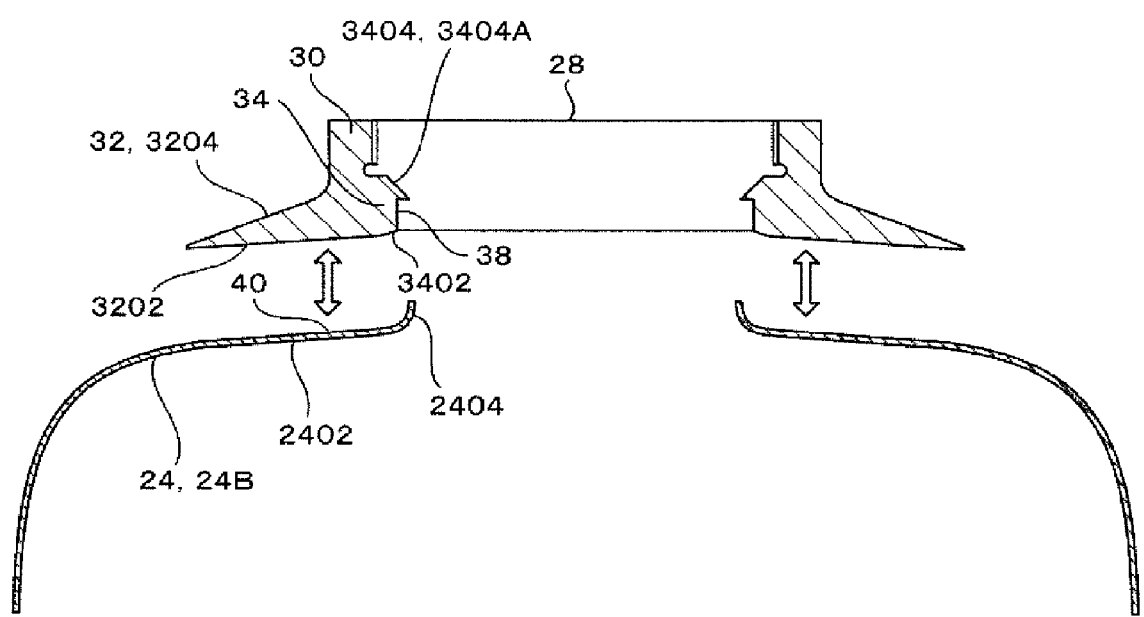
FIG. 8 is an explanatory diagram of an operation of attaching the mouthpiece to the inner liner.

As illustrated in FIG. 8, an operator applies the adhesive 40 to the surface of the plate portion 2402 for the skirt portion, which is provided to the inner liner 24, brings the center of the dome portion 24B and the mouthpiece 28 closer to each other in the axial direction of the mouthpiece 28, aligns the plate portion 2402 for the skirt portion with the skirt inner surface 3202 through intermediation of the adhesive 40, and aligns the plate portion 2404 for the expanded portion with the first expanded surface 3402.

With this operation, as illustrated in FIG. 5, among the adhesive 40 interposed between the plate portion 2402 for the skirt portion and the skirt inner surface 3202 and the adhesive 40 interposed between the plate portion 2402 for the skirt portion and the first expanded surface 3402, the excessive adhesive 40 overflows. The overflowing adhesive 40 is pushed into the lower receiving space 42A between the plate portion 2404 for the expanded portion and the annular missing portion 38, and is received in the lower receiving space 42A.

Further, as illustrated in FIG. 6, a sealant 44 fills a part of the lower receiving space 42A, which does not receive the adhesive 40, and the upper receiving space 42B, and the sealant 44 closes the upper receiving space 42B and forms the surface of the expanded portion 34.

The operator can visually confirm the space between the end 2404A of the plate portion 2404 for the expanded portion and the annular missing portion 38 (the lower receiving space 42A) directly through the opening portion 20 of the mouthpiece 28 from above without inserting a mirror inside the tank body 12 as in the related art. Therefore, the operator can securely confirm whether the overflowing adhesive 40 is received along the entire circumference of the annular missing portion 38 (the lower receiving space 42A), in a simple manner.

When it is confirmed that the adhesive 40 is received along the entire circumference around the annular missing portion 38 (the lower receiving space 42A), the adhesive 40 fills the space between the surface of the plate portion 2402 for the skirt portion and the skirt inner surface 3202 without forming a gap.

When filling of the adhesive 40 is confirmed, a state in which the plate portion 2402 for the skirt portion abuts against the skirt inner surface 3202 and the plate portion 2404 for the expanded portion abuts against the first expanded surface 3402 is held through use of a jig as appropriate, and the adhesive 40 is cured.

After the adhesive 40 is cured, the operator fills the sealant 44 in the part of the annular missing portion 38, which is exposed from the end 2404A of the plate portion 2404 for the expanded portion. Specifically, the sealant 44 fills the part of the lower receiving space 42A, which does not receive the adhesive 40, and the upper receiving space 42B.

With this, the sealant 44 closes the annular missing portion 38 together with the plate portion 2404 for the expanded portion, and forms the surface of the expanded portion 34 of the annular missing portion 38 together with the plate portion 2404 for the expanded portion.

Specifically, the adhesive 40 received in the lower receiving space 42A is covered with the plate portion 2404 for the expanded portion and the sealant 44.

When the sealant 44 is cured, an operation of attaching the mouthpiece 28 to the inner liner 24 is completed.

Further, the fiber-reinforced resin layer 26 is formed on the outer surface of the inner liner 24 to which the mouthpiece 28 is attached, and thus the aircraft water tank 10 is obtained.

According to the present embodiment, when the mouthpiece 28 is attached to the inner liner 24, the overflowing adhesive 40 is received in the annular missing portion 38 provided to the expanded portion 34 of the mouthpiece 28 through the gap between the skirt portion 32 and the inner liner 24.

Further, the sealant 44 fills the part of the annular missing portion 38, which is exposed from the end 2404A of the plate portion 2404 for the expanded portion.

Therefore, it can be visually confirmed whether the overflowing adhesive 40 is received along the entire circumference of the annular missing portion 38 directly through the opening portion 20 of the mouthpiece 28. Thus, unlike the related art, it is not required to confirm that the adhesive 40 overflows while observing the end of the inner liner 24 through use of a mirror inserted into the internal space of the tank body 12, to remove the overflowing adhesive 40 while performing observation through use of a mirror, or to perform a coating operation while performing observation through use of a mirror.

Further, there is no need to perform the operation of forming the inner liner 24, which requires the skilled technique of bending the end of the inner liner 24 and attaching the end to the expanded portion 34 by heating the end of the inner liner 24 and abutting the end against the expanded portion 34 through use of a dedicated jig.

Therefore, it is advantageous in simplifying the assembling operation of attaching the mouthpiece 28 to the inner liner 24 and reducing manufacturing costs.

The invention claimed is:

1. A method for manufacturing an aircraft water tank, comprising:
    forming an inner liner including a dome portion; and
    attaching a mouthpiece having an annular shape to a center of the dome portion, the mouthpiece being openable and closable by a lid,
    the mouthpiece including:
    a cylindrical portion including a joint potion, which is capable of being joined to the lid, at one axial end;
    a skirt portion spreading annularly outward of the cylindrical portion in a radial direction from the other axial end of the cylindrical portion; and
    an expanded portion that is expanded annularly inward of the cylindrical portion in the radial direction from the other axial end of the cylindrical portion,
    the skirt portion including a skirt inner surface to which the inner liner is attached,
    the expanded portion including:
    a first expanded surface formed of a curved surface that is continuously connected to the skirt inner surface, is displaced inward in the radial direction, and extends toward the one axial end of the cylindrical portion; and
    a second expanded surface that is displaced inward in the radial direction from a position corresponding to the expanded portion positioned on the one axial end side of the cylindrical portion, and extends toward the other axial end of the cylindrical portion, and
    the inner liner being attached from the skirt inner surface to the first expanded surface with an adhesive, the method further comprising
    providing an annular missing portion in the first expanded surface, the annular missing portion being depressed inside of the expanded portion with a width in an axial direction of the cylindrical portion and extending along an entire circumference of the first expanded surface in a circumferential direction,
    forming the center of the dome portion of the inner liner of a plate portion for the skirt portion, which is bonded to the skirt inner surface, and a plate portion for the expanded portion, which is connected continuously to an end of the plate portion for the skirt portion and bonded to the first expanded surface, and has an end positioned at an intermediate portion of the annular missing portion in a width direction under a state of being bonded to the first expanded surface,
    bringing the center of the dome portion and the mouthpiece close to each other in the axial direction of the mouthpiece, aligning the plate portion for the skirt portion with the skirt inner surface through intermediation of the adhesive, aligning the plate portion for the expanded portion with the first expanded surface, and receiving an excessive part of the adhesive in the annular missing portion, and
    filling a part of the annular missing portion, which is exposed from the end of the plate portion for the expanded portion, with a sealant.

2. An aircraft water tank, comprising:
    an inner liner including a dome portion; and
    a mouthpiece having an annular shape, the mouthpiece being attached to a center of the dome portion and being opened and closed by a lid,
    the mouthpiece including:
    a cylindrical portion including a joint potion, which is capable of being joined to the lid, at one axial end;
    a skirt portion spreading annularly outward of the cylindrical portion in a radial direction from the other axial end of the cylindrical portion; and
    an expanded portion that is expanded annularly inward of the cylindrical portion in the radial direction from the other axial end of the cylindrical portion,
    the skirt portion including a skirt inner surface to which the inner liner is attached,
    the expanded portion including:
    a first expanded surface formed of a curved surface that is continuously connected to the skirt inner surface, is displaced inward in the radial direction, and extends toward the one axial end of the cylindrical portion; and
    a second expanded surface that is displaced inward in the radial direction from a position corresponding to the expanded portion positioned on the one axial end side of the cylindrical portion, and extends toward the other axial end of the cylindrical portion, and
    the inner liner being attached from the skirt inner surface to the first expanded surface with an adhesive, wherein
    an annular missing portion is provided in the first expanded surface, the annular missing portion being depressed inside of the expanded portion with a width in an axial direction of the cylindrical portion and extending along an entire circumference of the first expanded surface in a circumferential direction,
    an end of the inner liner is positioned at an intermediate portion of the annular missing portion in a width direction, and the adhesive that is left over after bonding the inner liner to the skirt inner surface and the first expanded surface is received in a gap between the inner liner and the annular missing portion, and
    a sealant fills a remaining part of the annular missing portion, which does not receive the adhesive, and the adhesive received in the annular missing portion is covered with the inner liner and the sealant.

3. The aircraft water tank according to claim 2, wherein the second expanded surface is provided with a cone surface that is displaced inward in the radial direction and extends toward the other axial end of the cylindrical portion, and a sealing member mounted to the lid is held in elastic contact with the cone surface.

4. The aircraft water tank according to claim 2, wherein the annular missing portion is provided from a position in the first expanded surface, which is close to the second expanded surface, to a position in the second expanded surface, which is close to the first expanded surface.

5. The aircraft water tank according to claim 3, wherein the annular missing portion is provided from a position in the first expanded surface, which is close to the second expanded surface, to a position in the second expanded surface, which is close to the first expanded surface.

* * * * *